April 13, 1965 V. L. ARCHER ETAL 3,177,822
FLATTENING AND FLOUR DUSTING DEVICE FOR COOKIE MAKING MACHINE
Filed Sept. 6, 1962 2 Sheets-Sheet 1
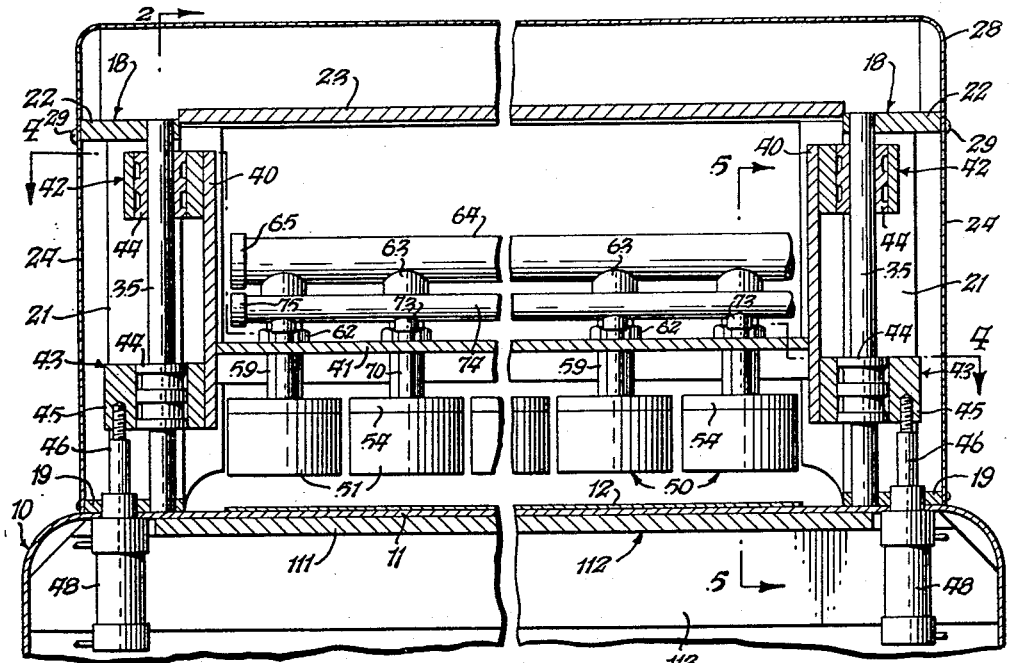
Fig. 1.
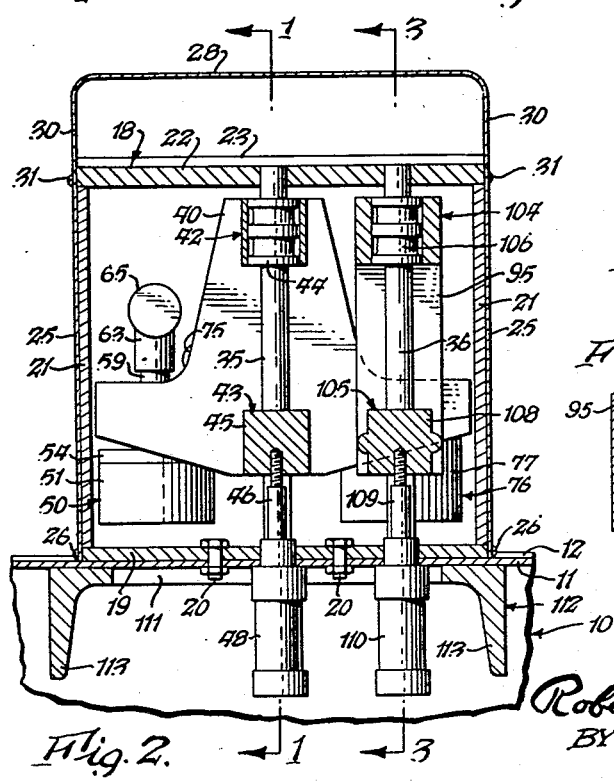
Fig. 2.
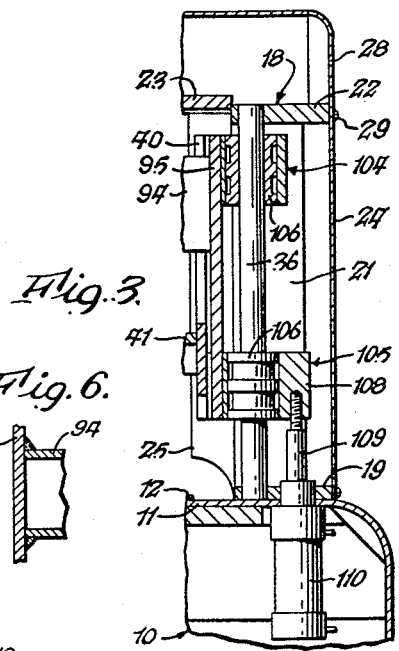
Fig. 3.
Fig. 6.
INVENTORS.
Virgil L. Archer
Robert M. Challender
BY Pope and Sommer
ATTORNEYS.

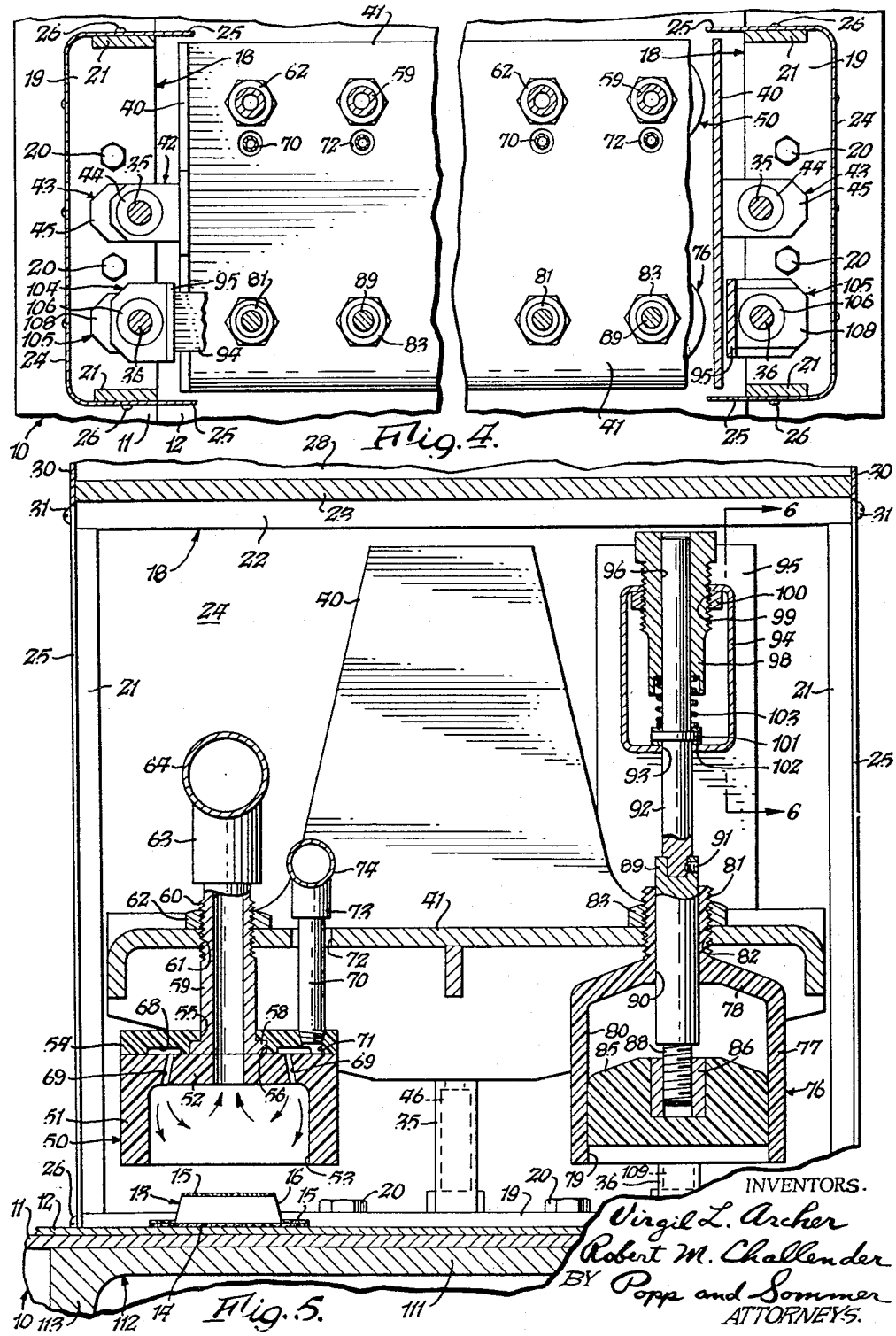

United States Patent Office 3,177,822
Patented Apr. 13, 1965

3,177,822
FLATTENING AND FLOUR DUSTING DEVICE FOR COOKIE MAKING MACHINE
Virgil L. Archer, Olean, and Robert M. Challender, Orchard Park, N.Y., assignors to Hauf's Development Co., Inc., Olean, N.Y., a corporation of New York
Filed Sept. 6, 1962, Ser. No. 221,768
13 Claims. (Cl. 107—15)

This invention relates to a device for distributing flour on lumps of cookie dough being conveyed through a cookie making machine and also removing any excess flour from the cookie stations on which the lumps of dough are placed, the device also operating to flatten the floured cookie to any desired outline and to have any desired embossment, such as lettering or a design, on its top face.

The present invention is particularly related to the copending applications of Virgil L. Archer for Flour Dropper for Cookie Making Machines, Serial No. 188,418, filed April 18, 1962 and Dough Dropper for Cookie Making Machines, Serial No. 188,384, filed April 18, 1962.

One of the principal objects of the present invention is to provide such a device which is so constructed that dough from the lumps or drops being processed on the conveyor will not stick to any part of the device or to the conveyor. Any sticking of dough to parts of the device would probably result in an entire row of cookies being misshapen until the defect were noticed by the operator of the cookie making machine.

Another object of the invention is to provide such a device in which the flour previously dropped at each cookie station and upon a lump of cookie dough also previously dropped at each cookie station is distributed over the lump of cookie dough, particularly on the abrupt or vertical sides thereof which abrupt sides, when the lump is flattened into cookie form, stretch out to form the bottom and top of the marginal portions of the cookie and in so stretching out, come into contact with the conveyor, the cups which determine the outline of the cookie, and the dies which flatten and may emboss the top face of the lump of cookie dough.

Another object of the invention which can be used to produce cookies of any outline and with any surface embossment.

Another object is to provide such a device which removes excess flour, the presence of such excess flour being highly detrimental to the baked cookie.

Another object of the invention is to provide such a device which will handle all forms of cookie dough including very fluid and sticky doughs as well as stiff plastic doughs and also including doughs containing edible solids such as nuts, raisins and the like.

Another important object of the invention is to provide such a device in which there is minimum mechanical working of the dough in flattening the lumps or drops, such mechanical working tending to impair the texture of the cookie, the cookie being heavier and denser and having reduced shelf life.

Another object of the present invention is to provide a machine which will simultaneously distribute flour, remove excess flour and flatten and form a long row of lumps or drops of cookie dough upon a moving conveyor or the like in which the flattened or formed cookies are all identical as to volume, consistency and shape so as to result, when baked, in cookies of identical weight, shape and quality.

Another object is to provide such a device which is rapid in action so that it can be used in conjunction with high speed line production of cookies.

Another object of the invention is to provide such a device in which the timing of the flour distributing and removing elements can be exactly synchronized with the movement of the flattening elements and with the movement of the conveyor in which the lumps or drops of cookie dough have been dropped.

Another object is to provide such a device which is free from accident hazards.

Another object is to provide such a device which will not be seriously impaired by any solid or foreign objects encountered in the dough.

Another object is to provide such a device in which the elements enclosing the lumps or drops of cookie dough and the elements used to flatten these lumps or drops can easily be adjusted vertically with reference to the belt or conveyor on which the lumps or drops of cookie dough have been deposited thereby to permit of adjustment to suit the production of different sizes of cookies.

Another important object is to provide such a device which is easily kept in a clean and sanitary condition.

Another object is to provide such a device in which there is no unwanted substantial escape of either the dough or flour so that at all times the machine is free from unsightly outcroppings of dough or flour.

Another object is to provide such a device which is trim and attractive in appearance and forms a desirable addition to a bakery.

Another object is to provide such a device which is simple and inexpensive in construction and which is free from servicing difficulties as well as not requiring close attention on the part of the operator.

Other objects and advantages will be apparent from the following description and drawings in which:

FIG. 1 is a vertical section taken generally on line 1—1, FIG. 2 through a device embodying the present invention and showing the same arranged first to distribute sifted flour previously applied to lumps of cookie dough arranged on successive rows of cookie stations on the moving belt of a cookie making machine and thereafter to mold or flatten the lump of cookie dough into the desired form of cookie.

FIG. 2 is a fragmentary vertical sectional view taken generally on line 2—2, FIG. 1.

FIG. 3 is a fragmentary vertical sectional view taken generally on line 3—3, FIG. 2.

FIG. 4 is a fragmentary horizontal section taken generally on line 4—4, FIG. 1.

FIG. 5 is an enlarged fragmentary vertical section taken generally on line 5—5, FIG. 1.

FIG. 6 is a fragmentary horizontal section taken generally on line 6—6, FIG. 3.

The flattening and dusting device forming the subject of the present invention is designed for use in conjunction with a cookie making machine having a base portion 10 providing a horizontal table top 11 carrying a belt 12 upon which the lumps or drops of cookie dough 13 have been dropped on a progression of rows of cookie stations extending transversely across the belt. Before such lumps of dough have been dropped upon the belt 12, as shown in FIG. 5, a pad 14 of flour had been dropped upon the belt at each cookie station and after dropping of the lump of dough 13 a second pad 15 of flour is dropped upon and around the cookie, it being observed that because the side walls 16 of the lump of dough 13 are relatively abrupt or steep, very little, if any, dropped flour is applied to these side walls. The device of the present invention is designed to not only remove the excess flour from and around the lump 13 of cookie dough but also to swirl this removed flour around in such manner that it thoroughly coats the abrupt side wall 16 of the cookie dough. Thereafter the device of the present invention flattens the cookie so that the floured side wall 16 of the cookie spreads radially outwardly to the sides of the mold which determines the outline of the cookie, it being also possible to impress any lettering or design at the top of the cookie dough which will be reproduced as an embossment in the baked cookie.

The embodiment of the present invention is shown as supported by a pair of end frames or heads indicated generally at 18 mounted on the table top 11 on opposite sides of the belt 12. Each end frame 18 is shown as comprising a base plate 19 secured to the table top 11 by bolts 20 and each having welded thereto a pair of vertical side plates 21 projecting upwardly from opposite ends thereof and supporting a horizontal top plate 22 which can also be welded to the side plates 21. The two end frames 18 are connected together by a horizontal top bridge plate 23 supported at its ends on the side plates 21 and suitably welded to these side plates and to the top plates 22.

Each end frame 18 can be enclosed by a cover shell 24 which is channel-shaped in horizontal section and has side walls 25 embracing the side plates 21 of each end frame and secured thereto, as by screws 26. The top of the device is shown as enclosed by an inverted cup-shaped top shell 28 which is generally rectangular in horizontal section and has vertical end walls embracing the top plates 22 of the end frames 18 and secured thereto, as by screws 29, and as having side walls 30 embracing the top bridge plate 23 and secured thereto, as by screws 31.

Each end frame 18 is provided with a pair of fixed vertical posts 35 and 36 which are arranged one in advance of each other in the direction of movement of the belt 12. These posts can be secured in the base plate 19 and top plate 22 of each end frame 18 in any suitable manner, as best illustrated in FIGS. 1 and 3. On one companion pair of these posts, namely the posts 35, is slidably mounted an assembly for enclosing two rows of lumps 13 of cookie dough, one enclosed row being subjected to air movement for distributing the sifted flour and removing any excess, and the other enclosed row being enclosed for the purpose of shaping the outline of the dusted cookie dough. The other companion pair of posts, namely the posts 36, slidingly support an assembly for moving flattening dies downwardly upon the other row of enclosed and dusted lumps of cookie dough for forming them into the desired surface conformation. These assemblies are preferably constructed as follows:

The numeral 40 represents a vertically movable vertical end plate within each end frame 18, this plate being of inverted T-shaped form in vertical outline and these plates being arranged parallel with each other and with the line of movement of the belt 12. The lower parts of these two end plates 40 are connected together by a cross channel 41 which can be welded thereto and the flanges of which project downwardly as best shown in FIG. 5, this channel extending across or bridging the belt 12. Each end plate 40 has fixed thereto a pair of vertically alined linear bearing blocks 42, 43 each containing a bushing 44 slidingly fitting the corresponding post 35. Each lower bearing block 43 is provided with a horizontal enlargement 45 into the bottom of which is screwed the upper end of a piston rod 46. The piston (not shown) at the lower end of each piston rod 46 works in a cylinder 48 contained within the base portion 10 and secured and projecting through the horizontal table top 11 thereof. It will accordingly be seen that by introduction of fluid into the pair of cylinders 48 the frame comprising the end plates 40 and cross channel 41 can be raised and lowered and that this movement is guided by the vertical posts 35.

The upstream side of the cross channel 41 carries a row of depending inverted cups 50 which are preferably made of a suitable organic plastic and each of which has a side wall 51 and a top wall 52 the bottom being open, as indicated at 53. Each of these cups is secured to the underside of a top plate 54 which can be made of the same organic plastic, this top plate having a central bore 55 which in turn is provided with an enlarged counterbore 56 at its lower end. This counterbore receives the radially enlarged flange 58 of a vertical pipe 59 which projects upwardly through the bore 55 and is threaded at its upper end, as indicated at 60. This threaded end of each pipe 59 extends through a threaded hole 61 of the cross channel 41 and is adjustably secured therein by means of a lock nut 62. The upper ends of the row of pipes 59 connect with downwardly projecting inlet nipples 63 of a vacuum manifold 64. One end of this vacuum manifold is closed by an end head 65 and the other end can be connected with a suction line (not shown) in any suitable manner, this suction line drawing the air and flour removed from the several cups 50 through a flour collector or separator which forms no part of the present invention and hence is not illustrated.

A feature of the invention resides in the manner of introducing air into each cup 50 in such way as to swirl or create a turbulence of the sifted flour around and to thoroughly coat the abrupt side wall 16 of the lump or drop 13 of cookie dough therein. To this end the top plate 54 of each cup 50 is shown as formed in its underside with an annular groove 68 communicating with an annular series of upright ducts 69 extending through the top wall 52 of each cup 50 and discharging into the interior of each cup. The annular series of these ports or ducts 69 are arranged concentric with the axis of the cup 50 and in order to obtain the desired swirling action, these ducts preferably diverge downwardly toward the bottom rim of the side wall 51 of each cup. By this arrangement the preponderance of the several streams of air emerging from the lower ends of these ducts or ports 69 is directed downwardly along the inner face of the side wall 51 of each cup to attack the double thickness of the two layers or pads 14, 15 surrounding the contained lump of dough 13 and resting on the belt 12. This double thickness of flour is swirled around the sides of the lump of cookie dough 13 to impinge against and thoroughly flour the abrupt side wall 16 thereof. The swirling flour not so impinging is drawn out through the center suction pipe 59 into the suction manifold 64.

The air for so flouring the abrupt side walls 16 of each row of lumps 13 of cookie dough and removing the excess flour therefrom is supplied to the several annular grooves or channels 68 of the top plates 54 of the cups 50 through vertical inlet pipes 70 the lower end of each of which is screwed into a bore 71 through the corresponding top plate 54 and communicating with its annular channel or groove 68. The air inlet pipe 70 extends through holes 72 in the cross channel 41 and connects with the downwardly projecting nipples 73 of an air inlet manifold 74. One end of this air inlet manifold is provided with a cap 75 and air can be supplied to the opposite end of this manifold in any suitable manner (not shown), it being essential that there be a pressure differential between the manifolds 64 and 74.

The downstream side of the cross channel 41 carries a row of inverted cups 76 which are preferably made of the same plastic as the cups 50 and have side walls 77 and a top wall 78, the cups being open at their bottoms as indicated at 79. The outline of the side walls 77 determines the outline of the cookie and hence can therefore take many shapes but for simplicity it is assumed that round cookies are to be formed and hence the open bottom bore 80 of each cup 76 is shown as being cylindrical. The bottom edges of the rows of cups 50 and 76 are aligned and for this purpose each cup 76 is provided with an upstanding coaxial externally threaded nipple 81 adjustably anchored in a threaded opening 82 in the cross channel 41 and locked in place by a lock nut 83.

Each lump of dough 13 is flattened to take the shape of the bore 80 and the top of each of these lumps can be formed or embossed to any suitable design by a mechanism which is preferably constructed as follows:

The numeral 85 represents a die or flattening head slidingly fitted in the bore 80 of each cup 76 and preferably made of the same plastic. Each die or flattening head 85 preferably has in its top a vertical central cylindrical insert 86 having an internally threaded vertical sleeve in which is screwed the lower threaded end 88 of a vertical plunger 89, this plunger being slidable vertically in the vertical bore 90 of the upstanding neck 81 of the cup 76. Each plunger 89 is secured, as by a set screw 91, to the lower end of a vertical rod 92 which projects upwardly through an opening 93 in the lower end of a horizontal tubular housing 94 which is secured at its ends, as by welding as shown in FIG. 6, to vertical end plates 95 arranged within the end frames 18, this tubular housing 94 serving all of the cups 76. Each rod 92 is slidingly fitted in the bore 96 of an externally threaded sleeve 98 working in a threaded bore 99 of a bar 100 extending the full length of the tubular housing 94.

Within the tubular housing 94 each rod 92 is provided with a radial enlargement 101 which is urged downwardly against a washer 102 on the bottom of the tubular housing 94 by a helical compression spring 103 interposed between the enlargement 101 and the threaded screw or sleeve 98.

Each end plate 95 is provided with a pair of vertically alined linear bearing blocks 104, 105 having alined vertical bores provided with bearing sleeves 106. These sleeves slidingly fit the stationary posts 36 forming parts of the end heads 18. The lower bearing block 105 in each end head 18 is provided with a horizontal enlargement 108 into which is screwed the upper end of a vertical piston rod 109. The piston (not shown) at the lower end of this piston rod works in a cylinder 110 contained within the base 10 of the machine. The upper end of this cylinder extends through and is secured to the table top 11 forming the top of the base.

In order to strengthen the table top 11 where the two rows of cups 50 and 76 come downwardly into contact with the belt 12 thereon, this table top can be reinforced by the web 111 of a cross channel 112 suitably secured within the base 10 in contact with the underside of the table 11 at the zone of action of the cups 50 and 76 and having downwardly projecting reinforcing flanges 113.

Operation

In the operation of the cookie making machine, the belt 12 on the table 11 is advanced step-by-step so as progressively to bring a transverse row of cookie stations thereon under the flattening and dusting device forming the subject of the present invention. In synchronism with this step-by-step movement of the belt the two hydraulic cylinders 48 are actuated to bring the cups 50 and 76 down into contact with or close proximity to the belt 12 so as substantially to enclose the lumps of dough 13 on the corresponding two rows of cookie stations.

This pressurizing of the cylinders 48 at opposite sides of the belt 12 retracts their piston rods 46 so as to pull the linear bearing blocks 43 downwardly thereby to lower the end plates 40 which are cross connected by the horizontal cross channel 41. This structure 40, 41 is guided, through the linear bearing blocks 42 and 43 on the stationary vertical posts 35 within the stationary end frames 18. Lowering the cross plate 41 lowers both rows of cups 50 and 76, which have a screw attachment therewith, as best shown in FIG. 5. This lowering is to an extent substantially to enclose the two rows of lumps 13 of cookie dough and can have actual contact with the now stationary belt 12 for this purpose. The vertical position of each individual cup 50 can be adjusted through turning of its attaching pipe 59 in the threads 61 after loosening of its lock nut 62, and the vertical position of each individual cup 76 can be adjusted vertically with reference to the cross plate 41 by turning of its neck 81 in the threads 82 after loosening its lock nut 83.

Each such row of lumps 13 of cookie dough first is enclosed by the row of cups 50 and the lumps of dough so enclosed by these cups rest on a pad 14 of flour and are covered with a second pad 15 of flour, the flour of these pads extending beyond and surrounding these lumps as best illustrated in FIG. 5. The lumps of dough can be produced as described in detail in said Archer application Serial No. 188,384 and the pads of flour can be produced as described in detail in the said Archer application Serial No. 188,418. The objective of so enclosing the lumps 13 of cookie dough in the cups 50, and under, around and over which the pads 14, 15 of flour have been dropped, is to permit the distribution of this previously dropped flour uniformly over the entire surface of the lump of cookie dough, particularly any vertical or abrupt side walls 16 thereof, and also to remove any excess flour, the presence of excess flour being highly undesirable in the baked cookie. To this end when each row of cookie dough lumps 13, previously so floured by dropped pads of sifted flour, is substantially enclosed in the corresponding row of cups 50, vacuum is applied to the manifold 64 and air is admitted to the manifold 74. With such a pressure differential, air from the several manifold outlet pipes 70 enters the circular channel 68 above each cup 51 and discharges downwardly through the ports or ducts 69 to discharge within each cup 50 toward the bottom rim of the side wall 51 thereof. This sets up a turbulence due to the necessity of this air to reverse in direction and travel upwardly to escape, so that the double layer of flour from the pads 14, 15 resting on the belt 12 around each lump 13 of cookie dough is swirled around and forcibly brought in contact with the abrupt side wall 16 of each lump of cookie dough so as to completely coat this side wall with flour. The excess flour passes out through the pipe 59 to the vacuum manifold 64 from which it can be withdrawn through its suitable dust collector (not shown).

At the same time that one row of lumps 13 of dough is so being acted upon in the cups 50, the next proceeding row of lumps 13 of dough is being flattened in the row of cups 76, this row of cups also having been brought into contact or close proximity with the belt 12 so as substantially to enclose each row of lumps 13 of cookie dough after having been dusted in the cups 50.

To flatten the lumps of cookie dough the pair of cylinders 110 are pressurized so as to retract their piston rods 109 downwardly. As illustrated in FIG. 3, this lowers each lower linear bearing block 105 and the vertical plate 95 attached thereto and which pair of plates 95 are cross connected by the tubular housing 94 so as to move in unison. This structure comprising the plates 95 and cross tube 94 is guided by means of their linear bearing blocks 104, 105 on the stationary posts 36 arranged in and forming part of each stationary end frame 18.

As best shown in FIG. 5, lowering the cross tube 94 lowers the group of threaded sleeves 98 thereby to press downwardly on the helical compression springs 103 and lower the rods 92. This reciprocates the connected rods 92, 89 downwardly, the rods 89 sliding in the bores 90 of the several cups 76. This pushes down on the die or flattening head 85 contained within each cup 76. Each die or flattening head engages the floured top of each lump 13 of cookie dough thereby to expand it sidewise. The actual movement of the dough so being flattened is from its interior to its abrupt side walls 16, these abrupt side walls enlarging to form both the extended top and bottom faces of the cookie as the downward movement of the flattening head or die 85 proceeds. It will therefore be seen that thoroughly dusting the abrupt vertical side walls 16 of the lumps of cookie dough with flour is exceedingly important in preventing sticking of the cookie dough either to the belt 12 or to the undersides of the dies or flattening heads 85. During the final downward movement of these dies or flattening heads 85, the margin or outer edge of each lump 13 of cookie dough is brought into contact with the bore 80 of each cup 76 so that the cookie takes the shape of the bore which, merely for convenience of illustration, is shown as being round. It will be seen that thorough flouring of the side walls 16 of the lumps of cookie dough is also important in preventing their sticking to the bores 80. Also the underside of each die or flattening head 85 can be embossed or formed to produce any desired design or lettering on the top of the cookie.

In the event that the downward movement of any die or flattening head 85 should be prematurely stopped, as by an excessive amount of dough in the particular lump 13 being acted upon, the helical compression spring 103 merely gives to the extent necessary to permit such premature stopping. Thus this spring permits the corresponding enlargement 101 of the rod 92 to rise away from the bottom wall of the cross tube 94 to accommodate the assumed excessive mass of cookie dough contained within the companion cup 76.

With cookies of different sizes and volumes, it is necessary, of course, to adjust the normal downward limit of the movement of each die or flattening head 85. This can readily be done by turning of the exteriorly threaded sleeve 98 if a very fine adjustment is required, this, of course, merely adjusting the back pressure of the helical compression springs 103, or by turning of the die or flattening heads 88 on the screw threads 88 so as to raise or lower the normal position of these dies or flattening heads in order to obtain a more extensive adjustment of these dies or flattening heads.

After each row of lumps 13 has so been flattened and shaped to the form of the row of cups 76, the cylinders 110 are pressurized to raise their piston rods 109 and the cross frame comprising the side plates 95 and connecting cross tube 94. This raises the rods 92 and 89 to lift the row of dies or flattening heads 85 from contact with the flattened cookies and into the upper parts of the row of cups 76.

Simultaneously with or preceding such upward movement of the dies or forming heads 85, the cylinders 48 are pressurized to raise their piston rods 46. This lifts the cross frame composed of cross channel 41 and end plates 40. This withdraws the two rows of cups 50 and 76 upwardly. It is also desirable to cut off the flow of air through the cups 50 at some time before they are again brought down to avoid flour being blown out from under the descending cups as they approach the pads of flour 14 and 15 on the belt in acting upon the next succeeding row of lumps of cookie dough.

After the two rows of lumps 13 of cookie dough have so been acted upon, the belt 12 is advanced one row of cookie stations and the operation is repeated.

From the foregoing it will be seen that the present invention provides an effective device for distributing flour around a lump of cookie dough in preparation for its being flattened, for removing any excess flour and which would be highly undesirable in the baked cookie, and for flattening the so flour dusted lump of cookie dough into any desired outline and to have any desired embossment on its top face.

We claim:

1. In a cookie making machine having a conveyer with a progression of cookie stations thereon; the combination therewith of means for distributing flour previously placed adjacent to a lump of cookie dough on said conveyer at each of said stations, comprising an inverted cup arranged above said conveyer in a vertical plane alining with the path of said progression of cookie stations, means for moving said cup vertically to lower said cup toward each cookie station substantially to enclose each lump of dough and the adjacent flour in a chamber formed by said conveyer and cup, and means for creating a turbulence in the air in said chamber to bring said flour into contact with the exposed parts of said lump of cookie dough, particularly any abrupt side wall thereof.

2. The combination set forth in claim 1 wherein said means for creating a turbulence in the air in said chamber comprises means for introducing and for exhausting air to and from different parts of said chamber under differential pressure.

3. The combination set forth in claim 2 wherein said means for introducing said air comprises a plurality of downwardly directed ducts in the top of said cup to create a plurality of downwardly directed jets of incoming air.

4. The combination set forth in claim 3 wherein said ducts and jets are directed toward the bottom rim of said cup and wherein said means for exhausting is arranged to exhaust air from the center of the top of said cup.

5. The combination set forth in claim 1 additionally including means for subsequently flattening each lump of cookie dough.

6. The combination set forth in claim 1 additionally including a second inverted cup arranged above said conveyer downstream from said first mentioned cup in said vertical plane, means for moving said second cup vertically to lower said second cup toward each cookie station substantially to enclose each lump of cookie dough in a chamber formed by said conveyer and second cup, a die mounted for vertical movement in said second cup to engage the top of each lump of cookie dough, and means for moving said die vertically to flatten said lump of cookie dough and bring its margin into contact with said second mentioned cup to be shaped as to outline by said second mentioned cup.

7. In a cookie making machine having a step-by-step conveyer with a progression of transverse rows of cookie stations thereon; the combination therewith of means for distributing flour previously placed adjacent to a lump of cookie dough at each of said stations, comprising a row of inverted cups arranged above and transversely of said conveyer with said cups severally in alinement with the cookie stations of each row, means for reciprocating said row of cups toward each row of cookie stations substantially to enclose the lumps of dough thereof and the adjacent flour in the chambers formed by said conveyer and row of cups, and means for creating a turbulence in the air in each of said chambers to bring said flour into contact with the exposed parts of said lumps of cookie dough, particularly any abrupt side walls thereof.

8. The combination set forth in claim 7 wherein said means for creating a turbulence in the air in said chamber comprises means for introducing air through a plurality of downwardly directed ducts in the top of said cup to create a pluraltiy of downwardly directed jets of incoming air, and means for exhausting said air from said chamber.

9. The combination set forth in claim 7 additionally including means for subsequently flattening each lump of cookie dough.

10. The combination set forth in claim 7 additionally including a second row of inverted cups arranged above and transversely of said conveyor downstream from said first mentioned row of cups and with the cups of said second row severally in alinement with the cookie stations of each row, means connecting said second row of cups to said first mentioned row of cups to reciprocate and vertically therewith to lower said second row of cups toward each row of cookie stations substantially to enclosure each lump of dough in chambers formed by said conveyer and second row of cups, a die mounted for vertical movement in each cup of said second row to engage the top of each lump of cookie dough, and means for moving said dies vertically to flatten said lumps of cookie dough and bring their margins into contact with said cups of said second row to be shaped as to outline thereby.

11. In a cookie making machine having a base supporting a table top carrying a step-by-step conveyer belt with a progression of transverse rows of cookie stations thereon; the combination therewith of means for distributing flour previously placed adjacent to a lump of cookie dough at each of said stations, comprising vertical posts fixed to and rising from said base on opposite sides of said belt, a frame structure bridging said belt and mounted at its ends for vertical sliding movement on said posts, a row of inverted cups depending from said frame structure, said row being arranged transversely of said belt with the cups thereof severally in alinement with the cookie stations of each row, means for reciprocating said frame structure vertically on said posts to lower said row of cups toward each row of cookie stations substantially to enclose the lumps of dough thereon and the adjacent flour in the chambers formed by said belt and row of cups, and means for creating a turbulence in the air in each of said chambers to bring said flour into contact with the exposed parts of said lumps of cookie dough, particularly any abrupt side walls thereof.

12. The combination set forth in claim 11 additionally including a second row of inverted cups depending from said frame structure arranged above and transversely of said belt downstream from said first mentioned row of cups and with the cups of said second row severally in alinement with the cookie stations of each row, a die mounted for vertical movement in each cup of said second row to engage the top of each lump of cookie dough and means for moving said dies vertically to flatten said lumps of cookie dough and bring their margins into contact with said cups of said second row to be shaped as to outline thereby.

13. The combination set forth in claim 12 wherein said last mentioned means comprises additional vertical posts fixed to and rising from said base on opposite sides of said belt, an additional frame structure bridging said belt and mounted at its opposite ends for vertical sliding movement on said additional posts, vertical rods connecting each die to move vertically with said additional frame structure, and means for reciprocating said additional frame structure.

References Cited by the Examiner
UNITED STATES PATENTS

| | | | |
|---|---|---|---|
| 2,195,836 | 4/40 | Brautigam | 107—15 X |
| 2,500,973 | 3/50 | Ackerman | 17—32 |
| 2,657,426 | 11/53 | Gora | 18—5 |
| 2,963,738 | 12/60 | Brandes | 18—5 |
| 3,071,087 | 1/63 | Kreisky. | |

ROBERT E. PULFREY, *Primary Examiner.*

J. D. BEIN, *Examiner.*